(12) United States Patent
Ike et al.

(10) Patent No.: US 7,185,539 B2
(45) Date of Patent: Mar. 6, 2007

(54) FLOW SENSOR

(75) Inventors: Shinichi Ike, Tokyo (JP); Nobuhiko Zushi, Tokyo (JP)

(73) Assignee: Yamatake Corporation (JP)

( * ) Notice: Subject to any disclaimer, the term of this patent is extended or adjusted under 35 U.S.C. 154(b) by 0 days.

(21) Appl. No.: 10/570,672

(22) PCT Filed: Aug. 26, 2004

(86) PCT No.: PCT/JP2004/012268

§ 371 (c)(1),
(2), (4) Date: Mar. 3, 2006

(87) PCT Pub. No.: WO2005/024354

PCT Pub. Date: Mar. 17, 2005

(65) Prior Publication Data

US 2006/0288773 A1    Dec. 28, 2006

(30) Foreign Application Priority Data

Sep. 3, 2003    (JP) .............................. 2003-310912

(51) Int. Cl.
*G01F 1/68* (2006.01)

(52) U.S. Cl. ................................................... 73/202.5

(58) Field of Classification Search ............... 73/202.5, 73/777, 720, 721, 726, 715, 862.381, 700, 73/204.11; 357/60
See application file for complete search history.

(56) References Cited

U.S. PATENT DOCUMENTS

| 4,203,128 | A | * | 5/1980 | Guckel et al. | ............... | 331/156 |
| 6,003,380 | A | * | 12/1999 | Sasaki et al. | ................. | 73/720 |
| 6,655,216 | B1 | * | 12/2003 | Aizawa | ....................... | 73/715 |

FOREIGN PATENT DOCUMENTS

| JP | 5-142009 | 6/1993 |
| JP | 2002-14070 | 1/2002 |
| JP | 2003-240618 | 8/2003 |

* cited by examiner

*Primary Examiner*—Jewel Thompson
(74) *Attorney, Agent, or Firm*—Cantor Colburn LLP

(57) ABSTRACT

In a flow sensor (1) including an anticorrosion metallic diaphragm; an insulating film formed on one surface of the metallic diaphragm; and a flow rate measuring sensor formed on the insulating film, the other surface of the metallic diaphragm being in contact with a fluid under measure, between the insulating film (122) on which sensor devices (25) are formed and the metallic diaphragm, a buffer layer (121) having an intermediate linear expansion coefficient between the linear expansion coefficient of the insulating film (122) and the linear expansion coefficient of an anticorrosion metal is interposed. Thereby, the sensitivity and response of the flow sensor are improved, and also the heat resistance is improved, by which the flow sensor is made especially suitable for measuring the flow rate of a corrosive fluid.

6 Claims, 2 Drawing Sheets

FLOW SENSOR

CROSS REFERENCE TO RELATED APPLICATIONS

This is a U.S. national stage of application No. PCT/JP2004/012268, filed on 26 Aug. 2004. Priority under 35 U.S.C. §119(a) and 35 U.S.C. §365(b) is claimed from Japanese Application No. 2003-310912, filed 3 Sep. 2003, the disclosure of which is also incorporated herein by reference.

TECHNICAL FIELD

The present invention relates to a flow sensor for measuring flow velocity or flow rate of a fluid flowing in a flow path. More particularly, it relates to a thermal type flow sensor.

BACKGROUND ART

Thermal type flow sensors for measuring flow rate or flow velocity of a fluid come in two types. Specifically, there have been known a type in which a shift in spatial temperature distribution of a fluid formed by heat generation of a heater, which is a heating element, is produced via the flow of fluid, and this shift is detected by a temperature sensor (indirectly heated type) and a type in which a change in electric power or a change in resistance caused by taking away the heat of a heating element by a fluid is detected, by which flow velocity or flow rate is detected (self-heating type). For the former conventional flow sensor, a type in which a sensor is patterned on the surface of silicon, and a fluid under measure is allowed to flow directly to this sensor pattern is available. However, a sensor chip utilizing silicon has a drawback of being liable to be corroded by a corrosive gas though it is excellent in terms of sensitivity and response. Therefore, in the case where the fluid under measure is a gas, only a gas that chemically eats away silicon can be allowed to flow.

However, in recent years, in addition to the flow sensor used for noncorrosive gases only, an indirectly heated type flow sensor having a construction usable for a liquid or a corrosive gas has come to be used (for example, refer to Unexamined Japanese Patent Publication No, 2002-122454, which is Patent Document 1).

Such a flow sensor 3 has, as shown in FIG. 4, a construction including a substrate 310 the surface side of which faces to a flow path 201 for a fluid under measure and a flow path forming member 220 and a plate 230, which are disposed so as to face to each other with the substrate 310 being interposed therebetween. The substrate 310 is made of stainless steel, and is formed into a plate shape having a thickness of about 50 to 150 μm. On the surface of the substrate 310 opposite to the flow path side, an electrical insulating film is formed, and on this film, a temperature detecting means for measuring flow velocity (flow rate) of a fluid, an ambient temperature sensor, electrode pads, and a wiring metal thin films are formed. Thus, a thin stainless steel sheet is used as the substrate 310, and the side opposite to the sensor forming surface is used as a flow path, by which this flow sensor 3 can be used in the case where the fluid under measure is a corrosive fluid.

Such an electrode insulating film of stainless steel sheet is formed by a silicon oxide ($SiO_2$) film, silicon nitride film, alumina, polyimide film, or the like having a thickness of, for example, several thousand angstroms to several micrometers. The silicon oxide film can be formed by, for example, sputtering, CVD, or SOG (spin-on-glass). On the other hand, the silicon nitride film can be formed by sputtering, CVD, or the like.

Also, on the surface of this electrical insulating film, a flow velocity detecting means and an ambient temperature detecting means individually including a plurality of electrode pads and a wiring metal thin film are formed by a publicly known thin film forming technique. Specifically, the flow velocity detecting means and the ambient temperature detecting means are formed by depositing a material such as platinum on the surface of electrical insulating film and by etching the material into a predetermined pattern. The flow velocity detecting means and the ambient temperature detecting means are individually connected electrically to the electrode pad via the wiring metal thin film. Further, each of the electrode pads is connected to an electrode terminal of a printed wiring board provided, via a spacer, above the sensor chip via a bonding wire, not shown.

Patent Document 1: Unexamined Japanese Patent Publication No, 2002-122454

In the case where the sensor chip is formed of an anticorrosion metal such as stainless steel, hastelloy, or inconel, it is necessary to finish the surface on which the insulating film (oxide film) is formed so as to be flat by polishing. However, such a metal does not consist of single crystals unlike a semiconductor. That is to say, silicon consists of single crystals and the surface thereof is strictly flush. Since stainless steel is a metal, a slight flaw is inevitably produced on the surface by polishing. No matter how carefully surface finishing by polishing is performed, surface roughness of some degree is produced on the surface.

Considering very fine irregularities constituting the surface roughness of some degree of the stainless steel surface, it is necessary to form an insulating film having a thickness of 10 μm or larger to secure insulation between a diaphragm and the sensor.

In the case where a diaphragm having a stainless steel base, in which an insulating film having the above-described thickness is formed on the surface thereof and thereby a strain gage is formed on the insulating film, is used as a pressure sensor diaphragm, such a sensor diaphragm especially has no problem associated with heat transfer characteristics. Therefore, such a metallic diaphragm can be used as a detecting element of a pressure sensor. However, in the case where a diaphragm provided with an oxide film and a sensor device having the same construction as that of the above-described diaphragm is used for a flow sensor, thermal characteristics such as heat conductivity degrade, so that actual use of such a diaphragm for a flow sensor is unfavorable.

Specifically, if such a diaphragm construction of pressure sensor is diverted to a thermal type flow sensor, the insulating film with low heat conductivity exerts an adverse influence on the sensitivity and response of the sensor. Silicon oxide ($SiO_2$), which is generally used as an insulating film, has a heat conductivity of 1.4 [W/mk], and austenitic stainless steel has a heat conductivity of 16 [W/mk]. Since the thickness of insulating film of 1 μm corresponds to the thickness of austenitic stainless steel of about 11 μm, when the thickness of insulating film increases, heat transfer due to thermal conduction between the sensor device and the fluid under measure via the thickness portion of diaphragm and the thickness portion of insulating film is hindered extremely.

On the other hand, the linear expansion coefficients of martensitic stainless steel, austenitic stainless steel, and silicon oxide used as the insulating film are as follows:
(1) Linear expansion coefficient of martensitic stainless steel (SUS400 series) . . . approximately $10 \times 10^{-6}/°$ C.
(2) Linear expansion coefficient of austenitic stainless steel (SUS300 series) . . . approximately $16 \times 10^{-6}/°$ C.
(3) Linear expansion coefficient of silicon oxide . . . approximately $0.8 \times 10^{-6}/°$ C.

As can be seen from such a difference in linear expansion coefficient between martensitic stainless steel and austenitic stainless steel, in the case where a single insulating film is formed on the surface of stainless steel, the stainless steel capable of being used as the diaphragm to relieve thermal stress due to the rising or lowering of temperature is limited to martensitic stainless steel, so that the degree of freedom in selecting material is restricted. That is to say, inherently, it is preferable that an insulating film consisting of, for example, silicon oxide be formed on the surface of austenitic stainless steel having higher corrosion resistance. However, such a configuration has a drawback in that, for example, a crack is formed in the insulating film by thermal stress because of the above-described difference in linear expansion coefficient between austenitic stainless steel and silicon oxide. Therefore, in the present situation, austenitic stainless steel cannot be used for the metallic diaphragm of flow sensor.

As described above, regarding the flow sensor having a construction in which a sensor pattern is formed, via an insulating film, on one surface of a diaphragm consisting of an anticorrosion metal such as stainless steel, and the other surface is brought into contact with a fluid under measure, in the case where only one layer of insulating film is present, an insulating film thickness that can withstand a withstand voltage of 100 V or higher is required, and on the other hand, in terms of flow sensor characteristics, the insulating film thickness is required to be as small as possible to improve heat conduction. Such contradictory requirements must be satisfied. In a configuration in which only one layer of insulating film with a thickness that satisfies both of the requirements is formed, the difference in thermal expansion coefficient between the insulating film and the stainless steel substrate cannot be relaxed, and thus there arises a problem in that a crack is formed in the insulating film in a high-temperature environment, and hence the sensor pattern on the insulating film is broken.

In the case where the diaphragm is formed of an anticorrosion metallic material such as stainless steel, the insulating film with a thickness of about 10 μm, which is indispensable in this case, becomes hindrance to the production of a thermal type flow sensor having high sensitivity and response.

An object of the present invention is to provide a flow sensor which has improved sensitivity and response and is especially suitable for measuring the flow rate of a corrosive fluid.

DISCLOSURE OF THE INVENTION

To achieve the above object, the present invention provides a flow sensor including an anticorrosion metallic diaphragm; an insulating film formed on one surface (one side surface) of the metallic diaphragm; and a flow rate measuring sensor formed on the insulating film, the other surface (the other side surface) of the metallic diaphragm being in contact with a fluid under measure, characterized in that between the insulating film on which the sensor is formed and the metallic diaphragm, a buffer member having an intermediate linear expansion coefficient between the linear expansion coefficient of the insulating film and the linear expansion coefficient of an anticorrosion metal is interposed.

By interposing the buffer member having such a linear expansion coefficient between the insulating film and the metallic diaphragm, a difference in thermal expansion coefficient between the insulating film on which a sensor pattern is formed and a stainless steel substrate can be relaxed. Therefore, no crack is formed in the insulating film even in a high-temperature environment, and sensor detection output characteristics that are stable for a long period of time can be obtained.

In the above-described flow sensor, the insulating film is preferably formed of a liquid source.

According to this preferred mode, since the insulating film is formed of a liquid source, the insulating film surface can be made flat though surface roughness on the surface of the metallic diaphragm is necessarily present to some degree, so that the sensor pattern can be formed on the insulating film in an optimum state. As a result, the output characteristics of sensor pattern are stabilized.

Also, the metallic diaphragm is preferably formed of austenitic stainless steel.

By using austenitic stainless steel with high corrosion resistance as a material for the metallic diaphragm, the degree of freedom in selecting a material for the metallic diaphragm of the flow sensor can be enhanced though the enhancement of the degree of freedom has been difficult in the conventional construction.

Also, the metallic diaphragm is preferably formed of any one of hastelloy, inconel, and nickel.

Hastelloy has a linear expansion coefficient of 14 to 16 $[\times 10^{-6}/°$ C.] and a heat conductivity of 10.6 [Wm/k], inconel has a linear expansion coefficient of 13 to 16 $[\times 10^{-6}/°$ C.] and a heat conductivity of 10.4 [Wm/k], and nickel has a linear expansion coefficient of 13.3 $[\times 10^{-6}/°$ C.] and a heat conductivity of 70.4 [Wm/k]. Since the metallic diaphragm is formed of a material having such a linear expansion coefficient, the same effect as described above is achieved. Therefore, the degree of freedom in selecting a material for the metallic diaphragm of the flow sensor can be enhanced.

Also, the buffer member is preferably formed of silicon nitride or alumina.

The linear expansion coefficient of silicon nitride is 3 to 4 $[\times 10^{-6}/°$ C.], and that of alumina is 5 to 9 $[\times 10^{-6}/°$ C.]. Since the buffer member is formed of a material having such a linear expansion coefficient, the same effect as described above is achieved. Therefore, the degree of freedom in selecting a material for the buffer member of the flow sensor can be enhanced.

Also, the buffer member is preferably formed by a plurality of layers consisting of at least two or more materials having an intermediate linear expansion coefficient between the linear expansion coefficient of the insulating film and the linear expansion coefficient of the anticorrosion metal.

Since the buffer member is formed in this manner, the linear expansion coefficient of buffer member can be changed stepwise. Therefore, the above-described action can further be achieved.

BEST MODE FOR CARRYING OUT THE INVENTION

A flow sensor in accordance with one embodiment of the present invention will now be described.

Figure 1:
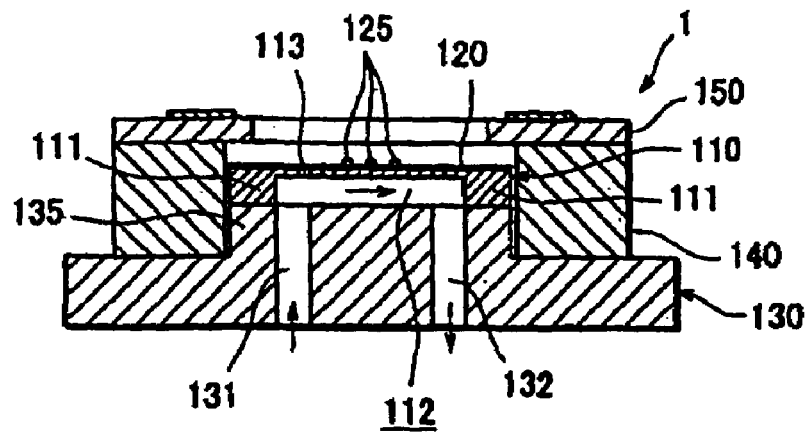
FIG. 1 is a sectional view showing a construction of a flow sensor in accordance with one embodiment of the present invention.
Figure 2:
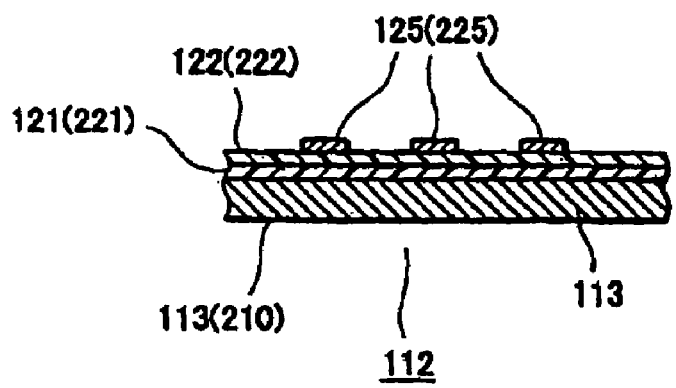
FIG. 2 is a partial sectional view of a sensor chip of the flow sensor shown in FIG. 1.

As shown in FIGS. 1 and 2, a flow sensor 1 in accordance with one embodiment of the present invention includes a metallic sensor chip 110 which has a flow path forming concave portion 112 in the back surface and is formed with flow rate measuring sensor devices 125 on the top surface via a buffer layer (buffer member) 121 and an insulating film 122 (shown in FIG. 2 only), and a flow path forming member 130 which is made of metal and forms a flow path integrally with the back surface of the sensor chip 110.

Such a flow sensor 1 is characterized in that the sensor chip 110 having a configuration different from that of the conventional sensor chip is welded to the flow path forming member.

Specifically, the sensor chip 110 is formed into a thin and slender rectangular plate consisting of stainless steel (especially, SUS316L etc.), and over the whole of one surface (top surface in FIG. 1) thereof, the buffer layer 121 and the insulating film 122 are formed in the named order in a laminated state as shown in FIG. 2.

Also, in a central portion on the back surface side of the sensor chip 110, the concave portion 112 of an elliptic shape is formed. By this concave portion 112, a thin-wall portion 113 is formed in the sensor chip 110. Thereby, the other surface of the sensor chip 110 is brought into contact with a fluid under measure. The thin-wall portion 113 has a thickness of about 50 μm to 150 μm, and forms a sensor portion of a diaphragm construction. Also, the length (width) of the thin-wall portion perpendicular to the flow direction is preferably about 1 mm to 3 mm in order to secure the strength. Also, in the case of this embodiment, a thick-wall portion 111 of the sensor chip 110 has a thickness of about 0.6 mm.

The concave portion 112 and the surrounding thick-wall portion 111 of the sensor chip 110 are formed by the photolithography technique and the etching technique, an end mill, or a composite technique thereof. In the case where the photolithography technique and the etching technique are used, first, a resist is applied to the whole of back surface of a stainless steel made wafer by spin coating etc. or a dry film resist is affixed thereto, and ultraviolet rays (or electron beams) are irradiated to exposedly transfer a mask pattern onto the resist. Next, the exposed resist is developed with a developing solution, and an unnecessary portion of resist is removed. By leaving or removing the exposed portion, a negative resist or a positive resist is selected. In a portion from which the resist is removed, the wafer is exposed, and this led-through portion is removed until the thickness becomes about 50 μm to 150 μm by wet etching or dry etching. Then the leaving resist is peeled off, removed, and cleaned, by which the thin-wall portion 113 and the concave portion 112 are formed. In the case of wet etching, the led-through portion is dissolved little by little by being dipped in or by being sprayed with an etching solution. In the case of dry etching, ions or electrons are irradiated onto the back surface of the wafer by sputtering, plasma, or the like, by which the back surface is scraped little by little.

The surface of the thin-wall portion 113 of the sensor chip 110, which is opposite to the surface that is not in contact with the fluid under measure, is mirror polished as described above, and as shown in FIG. 2, the insulating film 122 is formed over the whole surface via the buffer layer 121. On the insulating film 122, the sensor devices 125 of platinum are patterned.

This point is explained in more detail. In this embodiment, the buffer layer 121 also having a function as an insulating film is formed on the thin-wall portion of stainless steel substrate, and the insulating film 122 consisting of, for example, silicon oxide produced by using a liquid source as a raw material is formed on the buffer layer 121. That is to say, the insulating film 122 is further formed on the buffer layer 121 having insulating properties, and a two-layer insulating film layer structure in which one or more platinum patterns for measuring temperature resistive element are formed on the insulating film 122 is provided.

As the insulating film 122, a material such as a silicon oxide ($SiO_2$) film, silicon nitride film, alumina, polyimide, or the like having a thickness of, for example, several thousand angstroms to several micrometers is used. The silicon oxide film, which is an insulating film, can be formed by, for example, sputtering, CVD, or SOG (spin-on-glass). Also, in the case where silicon nitride film is used as the insulating film, the silicon nitride film can also be formed by sputtering, CVD or the like. Also, the insulating film may be formed as an insulating film consisting of a liquid source such as polysilazane by spin coating, spray technique, or the like. By making the insulating film consisting of such a liquid source, a dense film having excellent covering properties against inevitable fine irregularities caused by surface polishing of stainless steel surface can be formed at a low cost.

Also, the buffer layer 121 is formed of a material such as silicon nitride (linear expansion coefficient: 3 to 4 $[\times 10^{-6}/°C.]$), alumina (linear expansion coefficient: 5 to 9 $[\times 10^{-6}/°C.]$), or the like, the linear expansion coefficient of which is located between the linear expansion coefficients of stainless steel and the insulating film 122. The buffer layer is formed by CVD, sputtering, or the like, and the buffer layer may be formed into a plurality of layers.

That is to say, the insulating film 122 and the buffer layer 121 are selected appropriately from the above-described materials so that the linear expansion coefficient of the thin-wall portion 113 consisting of stainless steel, the linear expansion coefficient of the buffer layer 121, and the linear expansion coefficient of the insulating film 122 decrease in the named order. The fact that the buffer layer has an intermediate linear expansion coefficient between the linear expansion coefficient of the insulating film on which the flow rate measuring sensor devices are formed and the linear expansion coefficient of the thin-wall portion consisting of an anticorrosion metal is an essential portion of the present invention.

On the other hand, on the surface of the insulating film 122, the sensor devices 125 consisting of a flow velocity detecting means and an ambient temperature detecting means individually including a plurality of electrode pads and a wiring metal thin film are formed by the publicly known thin film forming technique. The sensor device 125 is formed by depositing a material such as platinum on the surface of electrical insulating film and by etching the material into a predetermined pattern. The flow velocity detecting means and the ambient temperature detecting means constituting the sensor device 125 is electrically connected to the electrode pads via the wiring metal thin film. As shown in FIG. 1, the electrode pads are connected, via a bonding wire, not shown, to an electrode terminals of a printed wiring board 150 provided on the sensor chip 110 via a spacer 140.

Figure 3:
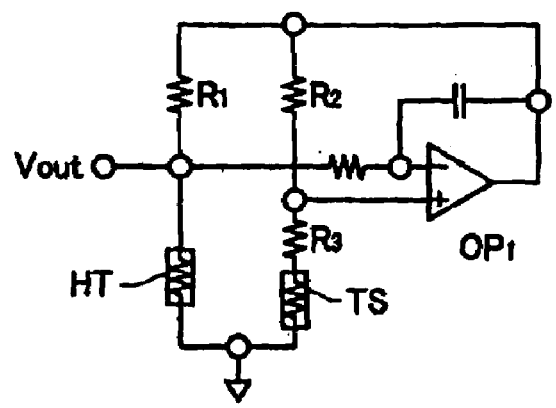
FIG. 3 is a circuit diagram showing a sensor device of a flow sensor in accordance with one embodiment of the present invention.

The flow velocity detecting means and the ambient temperature detecting means constituting the sensor device 125 are configured so that as shown in FIG. 3, in the sensor device 125 using one heating element HT, flow velocity can be converted into a voltage signal by using a fixed temperature difference circuit. This fixed temperature difference circuit includes, as shown in FIG. 3, a bridge circuit made up of resistors R1 and R2, the heating element (resistance heater) HT, a resistor R3, and an ambient temperature sensor TS, and an operational amplifier OP1 which inverting-inputs a middle-point voltage of the resistor R1 and the heating element HT and also non-inverting-inputs a middle-point voltage of the resistor R2 and the resistor R3. The output of the operational amplifier OP1 is connected in common to one end of resistors R1 and R2 constituting the bridge circuit. For the resistors R1, R2 and R3, the resistance value is set so that the temperature of the heating element HT is always higher than the temperature detected by the ambient temperature sensor TS by a certain value.

When a fluid is allowed to flow in a predetermined direction, heat is taken away from the heating element HT by the fluid, the resistance value of the heating element HT decreasing, and an equilibrium state of the bridge circuit is lost. However, since a voltage corresponding to the voltage produced between the inverting input and the non-inverting input by the operational amplifier OP1 is applied to the bridge circuit, the caloric value of the heating element HT increases so that the heat taken away by the fluid is compensated. As a result, the resistance value of the heating element HT increases, by which the bridge circuit returns to the equilibrium state. Therefore, a voltage corresponding to the flow velocity is applied to the bridge circuit in an equilibrium state. The fixed temperature difference circuit shown in FIG. 3 is configured so as to deliver a voltage across terminals of the heating element HT of the voltages applied to the bridge circuit at this time as a voltage output.

The fixed temperature difference circuit controls current or voltage to keep the temperature difference constant so that the temperature of the heating element HT is higher than the ambient temperature measured by the ambient temperature sensor TS by a certain value as described above, and a change in the voltage, current, or power is detected, by which the flow velocity or flow rate of fluid can be measured.

On the other hand, as shown in FIG. 1, the flow path forming member 130 is formed by a slender metal sheet made of stainless steel like sensor chip 110 and has a convex portion 135, which is projectingly provided in the center of the surface and the external shape of which substantially coincides with the outer edge of the sensor chip 110, and two through holes 131 and 132, which are formed in parallel with each other and each have one opening in the upper surface of the convex portion 135.

The sensor chip is positioned on the flow path forming member so that the outer edge of the sensor chip 110 coincides with the convex portion 135 of the flow path forming member, namely, the side wall of the convex portion 135 is flush with the side wall of the sensor chip 110 over the whole circumference, and in this state, the sensor tip 110 and the flow path forming member 130 are joined to each other by a suitable welding means such as laser beam welding, by which the flow sensor 1 is produced.

Successively, the operation of the flow sensor 1 constructed as described above is explained below.

In the flow sensor 1 in accordance with this embodiment, a two-layer structure of the buffer layer 121 also acting as an insulating film and the insulating film 122 having covering properties against irregularities of the stainless steel surface is provided on one surface of the sensor chip 110, and the buffer layer 121 has an intermediate linear expansion coefficient between the linear expansion coefficient of the insulating film 122 on which the sensor devices 125 are formed and the linear expansion coefficient of the thin-wall portion 113 formed of stainless steel. Therefore, the thickness of the insulating film 122 can be made as small as, for example, about 1 µm to 5 µm while the withstand voltage of flow sensor is maintained. For this reason, the heat generated from the heater HT of the sensor device 125 can be transmitted efficiently to the side of fluid under measure via the thin insulating film 122 and buffer layer 121. As a result, the sensitivity and response of the flow sensor are improved.

Also, since the difference in thermal expansion coefficient produced at the heating time can be relaxed to some degree, austenitic stainless steel with high corrosion resistance can be used as a material for a metal portion of the sensor chip 110. Thereby, the degree of freedom in selecting a material for the metal portion of the sensor chip 110 can be enhanced though the enhancement of the degree of freedom has been difficult in the conventional construction. Also, even if the temperature increases, crack formation in the insulating film due to a difference in linear expansion coefficient is less liable to occur. Therefore, the corrosion resistance can be improved up to a temperature close to 500° C., so that a flow sensor excellent in environment resistance can be provided.

Also, since the insulating film 122 is formed of a liquid source, the covering properties against inevitable fine irregularities caused by surface polishing of stainless steel surface are excellent. Thereby, the insulating film surface can be made flat though surface roughness on the surface of metallic diaphragm is necessarily present to some degree. As a result, a sensor pattern can be formed in an optimum state on the insulating film, so that the output characteristics of sensor pattern can be stabilized.

Figure 4:
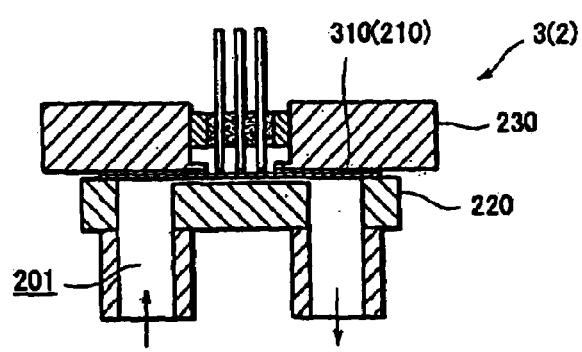
FIG. 4 is a sectional view showing a construction of a conventional flow sensor and a construction of a flow sensor in which the conventional flow sensor construction is diverted to the present invention.

The two-layer structure of buffer layer and oxide film relating to the sensor chip 110 of the flow sensor 1 in accordance with the above-described embodiment may be applied to the flow sensor 3 explained in the prior art. Specifically, a new flow sensor 2 may be produced by using a substrate having the two-layer structure of buffer layer and oxide film in place of the conventional substrate provided in the flow sensor 3. As shown in FIG. 4, this flow sensor 2 has a construction provided with a substrate 210 the top surface side of which faces to the flow path of a fluid under measure, and a flow path forming member 230 and a plate 220 disposed so as to face to each other with the substrate 210 held therebetween. The substrate 210 is made of stainless steel, and is formed into a plate shape having a thickness of about 50 to 150 µm. On the surface on the side opposite to the flow path side, an electrical insulating film is formed, and on the insulating film, a temperature detecting means for measuring the flow velocity (flow rate) of fluid, an ambient temperature sensor, electrode pads, and wiring metal thin films are formed.

The substrate 210 has a two-layer structure consisting of the buffer layer and the oxide film equivalent to those of the sensor chip 110 in accordance with this embodiment. Specifically, as shown in FIG. 2, there is used a substrate in which an insulating film 222 is formed on the thin-wall portion made of stainless steel via a buffer layer (buffer member) 221, and a sensor pattern 225 is formed on the insulating film.

More detailedly, the surface of the substrate 210 formed of stainless steel is mirror polished, the buffer layer 221 also having a function as an insulating film in this embodiment is formed on the substrate, and the insulating film 222 formed of, for example, silicon oxide produced by using a liquid source as a raw material is formed on the buffer layer 221. On the surface of the insulating film 222, a sensor devices 225 consisting of a flow velocity detecting means and an ambient temperature detecting means individually including a plurality of electrode pads and a wiring metal thin film are formed by the publicly known thin film forming technique. The flow velocity detecting means and the ambient temperature detecting means constituting the sensor device 225 each is provided with the electrode pads. Further, each of the electrode pads is connected to an electrode terminal of a printed wiring board provided, via a spacer, above the sensor chip via a bonding wire, not shown.

As the insulating film 222, a silicon oxide ($SiO_2$) film, silicon nitride film, alumina, polyimide film, or the like having a thickness of, for example, several thousand angstroms to several micrometers is used. Also, as in the case of the above-described embodiment the buffer layer 221 has an intermediate linear expansion coefficient between the linear expansion coefficient of the insulating film 222 on which the sensor devices 225 are formed and the linear expansion coefficient of the substrate (diaphragm) 210. Specifically, the buffer layer 221 is formed of a material such as silicon nitride (3 to 4 [$\times 10^{-6}/°$ C.]), alumina (5 to 9 [$\times 10^{-6}/°$ C.]), or the like, the linear expansion coefficient of which is determined between the linear expansion coefficients of stainless steel and the insulating film 222.

Since such a substrate is provided, as in the case of the above-described embodiment, the thickness of the insulating film can be made as small as, for example, about 1 μm to 5 μm while the withstand voltage of flow sensor 2 is sufficiently maintained. For this reason, heat can be transmitted efficiently from a heater formed on one surface of the substrate 210 to a fluid under measure that is in contact with the other surface of the substrate 210. As a result, the sensitivity and response of the flow sensor 2 are improved. Also, the metallic material of the sensor chip can be made austenitic stainless steel though the use of austenitic stainless steel has been difficult in the conventional construction, so that the degree of freedom in selecting a metallic material can be enhanced. In addition, even if the temperature increases, crack formation in the insulating film due to a difference in linear expansion coefficient is less liable to occur. Therefore, the heat resistance can be improved up to a temperature close to 500° C.

As an anticorrosion metal other than stainless steel, generally, hastelloy, inconel, and nickel can be cited. Inconel has a linear expansion coefficient of 13 to 16 [$\times 10^{-6}/°$ C.] and a heat conductivity of 10.4 [Wm/k], hastelloy has a linear expansion coefficient of 14 to 16 [$\times 10^{-6}/°$ C.] and a heat conductivity of 10.6 [Wm/k], and nickel has a linear expansion coefficient of 13.3 [$\times 10^{-6}/°$ C.] and a heat conductivity of 70.4 [Wm/k].

Therefore, as described above, the material used for a metal portion of the substrate 210 is not limited to stainless steel, and anticorrosion metals such as hastelloy, inconel, and nickel can also achieve the same effect.

INDUSTRIAL APPLICABILITY

The flow sensor in accordance with this embodiment is especially suitable for measuring flow velocity or flow rate of a corrosive fluid flowing in a flow path.

The invention claimed is:

1. A flow sensor comprising an anticorrosion metallic diaphragm; an insulating film formed on one surface of the metallic diaphragm; and a flow rate measuring sensor formed on the insulating film, the other surface of the metallic diaphragm being in contact with a fluid under measure, characterized in that between the insulating film on which the sensor is formed and the metallic diaphragm, a buffer member having an intermediate linear expansion coefficient between the linear expansion coefficient of the insulating film and the linear expansion coefficient of an anticorrosion metal is interposed.

2. The flow sensor according to claim 1, characterized in that the insulating film is formed of a liquid source.

3. The flow sensor according to claim 1, characterized in that the metallic diaphragm is formed of austenitic stainless steel.

4. The flow sensor according to claim 1, characterized in that the metallic diaphragm is formed of any one of hastelloy, inconel, and nickel.

5. The flow sensor according to claim 1, characterized in that the buffer member is formed of silicon nitride or alumina.

6. The flow sensor according to claim 1, characterized in that the buffer member is formed by a plurality of layers consisting of at least two or more materials having an intermediate linear expansion coefficient between the linear expansion coefficient of the insulating film and the linear expansion coefficient of the anticorrosion metal.

* * * * *